(12) United States Patent
Manthiram et al.

(10) Patent No.: US 9,882,210 B2
(45) Date of Patent: Jan. 30, 2018

(54) COMPOSITE ANODE MATERIALS FOR LITHIUM ION BATTERIES

(75) Inventors: Arumugam Manthiram, Austin, TX (US); Sukeun Yoon, Seoul (KR)

(73) Assignee: Board of Regents of the University of Texas System, Austin, TX (US)

( * ) Notice: Subject to any disclaimer, the term of this patent is extended or adjusted under 35 U.S.C. 154(b) by 968 days.

(21) Appl. No.: 13/301,447

(22) Filed: Nov. 21, 2011

(65) Prior Publication Data

US 2012/0125154 A1 May 24, 2012

Related U.S. Application Data

(63) Continuation of application No. PCT/US2010/036469, filed on May 27, 2010.

(60) Provisional application No. 61/182,024, filed on May 28, 2009.

(51) Int. Cl.
| | |
|---|---|
| *B22F 1/00* | (2006.01) |
| *H01M 4/485* | (2010.01) |
| *B82Y 30/00* | (2011.01) |
| *H01M 4/04* | (2006.01) |
| *H01M 4/133* | (2010.01) |
| *H01M 4/1393* | (2010.01) |
| *H01M 4/36* | (2006.01) |
| *H01M 4/38* | (2006.01) |
| *H01M 4/587* | (2010.01) |
| *H01M 10/0525* | (2010.01) |

(52) U.S. Cl.
CPC ............. *H01M 4/485* (2013.01); *B82Y 30/00* (2013.01); *H01M 4/0404* (2013.01); *H01M 4/133* (2013.01); *H01M 4/1393* (2013.01); *H01M 4/364* (2013.01); *H01M 4/38* (2013.01); *H01M 4/387* (2013.01); *H01M 4/587* (2013.01); *H01M 10/0525* (2013.01)

(58) Field of Classification Search
CPC ........ B82Y 30/00; H01M 4/364; H01M 4/485
USPC .......................................................... 75/252
See application file for complete search history.

(56) References Cited

U.S. PATENT DOCUMENTS

| | | |
|---|---|---|
| 4,436,796 A | 3/1984 | Huggins et al. |
| 5,039,582 A | 8/1991 | Pistoia |
| 5,283,136 A | 2/1994 | Peled et al. |
| 5,478,671 A | 12/1995 | Idota et al. |
| 6,007,945 A | 12/1999 | Jacobs et al. |
| 6,203,944 B1 | 3/2001 | Turner et al. |

(Continued)

FOREIGN PATENT DOCUMENTS

| | | |
|---|---|---|
| EP | 1873846 | 1/2008 |
| JP | 2003-017051 | 1/2003 |
| KR | 10-2009-0041950 | 4/2009 |

OTHER PUBLICATIONS

International Search Report for PCT Application No. PCT/US2010/036469 dated Feb. 7, 2011.

(Continued)

*Primary Examiner* — Jie Yang
(74) *Attorney, Agent, or Firm* — Meyertons, Hood, Kivlin, Kowert & Goetzel, P.C.; Mark R. DeLuca

(57) ABSTRACT

The present invention provides compositions and methods of making Sn-MCx-C and Sb-MOx-C nanostructured anode compositions that exhibit excellent capacity retention with high capacity and rate capability that alleviate the volume expansion encountered with alloy anodes during the charge-discharge process.

13 Claims, 13 Drawing Sheets

(56) References Cited

U.S. PATENT DOCUMENTS

| | | |
|---|---|---|
| 6,599,662 B1 * | 7/2003 | Chiang et al. ............. 429/218.1 |
| 6,730,434 B1 | 5/2004 | Kawakami et al. |
| 6,949,312 B1 | 9/2005 | Kawakami et al. |
| 7,285,329 B2 * | 10/2007 | Kaneko et al. ............... 428/403 |
| 7,771,876 B2 | 8/2010 | Mizutani et al. |

OTHER PUBLICATIONS

Written Opinion for PCT Application No. PCT/US2010/036469 dated Feb. 7, 2011.
International Preliminary Report on Patentability for PCT Application No. PCT/US2010/036469 dated Nov. 29, 2011.

* cited by examiner

COMPOSITE ANODE MATERIALS FOR LITHIUM ION BATTERIES

PRIORITY CLAIM

This application is a Continuation of PCT Patent Application No. PCT/US2010/036469 entitled "NOVEL COMPOSITE ANODE MATERIALS FOR LITHIUM ION BATTERIES" filed on May 27, 2010, which claims the benefit of U.S. Provisional Application No. 61/182,024 filed on May 28, 2009.

BACKGROUND OF THE INVENTION

1. Field of the Invention

The present invention relates in general to the development of novel composite materials, and more particularly, to the development and use of novel nanocomposite anode materials to replace the carbon anode in lithium ion cells.

2. Description of the Relevant Art

Without limiting the scope of the invention, its background is described in connection with anode materials for lithium ion batteries. Lithium ion batteries have become the choice of power source for portable electronic devices such as cell phones, laptops, and PDAs due to their higher energy density compared to other rechargeable systems. They are also being intensively pursued for plug-in hybrid electric vehicles (PHEV) and electric vehicles (EV). Lithium ion batteries currently use graphite as the anode due to its excellent cycling behavior. However, the currently used carbon anode has the drawbacks of limited capacity (372 mAh/g) and safety concerns. Particularly, formation of solid-electrolyte interfacial (SEI) layer by a reaction of the carbon anode surface with the electrolyte and lithium plating in carbon anode arising from a charge/discharge potential close to that of $Li/Li^+$ pose serious safety concerns. These difficulties have created enormous interest in the development of alternate anode materials.[1-3]

U.S. Pat. No. 6,203,944 issued to Turner et al. (2001) provides electrode compositions suitable for use in secondary lithium batteries in which the electrode compositions have high initial capacities that are retained even after repeated cycling. The electrode compositions also exhibit high coulombic efficiencies. The electrode compositions, and batteries incorporating these compositions, are also readily manufactured. According to the '944 patent an electrode for a lithium battery that includes (a) an electrochemically active metal element which, prior to cycling, is in the form of an intermetallic compound or an elemental metal and (b) a non-electrochemically active metal element. The electrode has high initial capacities that are retained even after repeated cycling. The electrode also exhibits high coulombic efficiencies.

U.S. Pat. No. 6,949,312 issued to Kawakami and Asao (2005) discloses an electrode material for an anode of a rechargeable lithium battery, containing a particulate comprising an amorphous Sn-A-X alloy with a substantially non-stoichiometric ratio composition. For said formula Sn-A-X, A indicates at least one kind of an element selected from a group consisting of transition metal elements, X indicates at least one kind of an element selected from a group consisting of O, F, N, Mg, Ba, Sr, Ca, La, Ce, Si, Ge, C, P, B, Pb, Bi, Sb, Al, Ga, In, Tl, Zn, Be, Pr, Nd, Sm, Eu, Gd, Tb, Dy, Ho, Er, Tm, Yb, Lu, As, Se, Te, Li and S, where the element X is not always necessary to be contained.

SUMMARY OF THE INVENTION

The present invention provides a Sn-$MC_x$—C nanostructured anode composition exhibiting excellent capacity retention with high capacity and rate capability having a Sn-$MC_x$—C anode composition that alleviates the volume expansion encountered with alloy anodes during the charge-discharge process, wherein x is between 0.01 and 4 and M is selected from the group consisting of Ti, V, Cr, Mn, Fe, Mo, W, Al, Si, or combinations thereof. In some embodiments, the Sn-$MC_x$—C anode composition includes TiC, $Fe_3C$, SiC and may or may not include one or more dopants to form a doped Sn-$MC_x$—C anode composition.

The present invention also provides a Sb-$MO_x$—C nanostructured anode composition exhibiting excellent capacity retention with high capacity and rate capability having a Sb-$MO_x$—C anode composition that alleviates the volume expansion encountered with alloy anodes during the charge-discharge process, wherein x is between 0.1 and 3 and M is selected from the group consisting of Al, Mg, Ti, V, Cr, Mn, Fe, Co, Ni, Zr, Mo, W, Nb, Ta, or combinations thereof. In some embodiments, the Sb-$MO_x$—C anode composition having $Al_2O_3$, $TiO_2$, $MoO_3$ and may or may not include one or more dopants to form a doped Sb-$MO_x$—C anode composition.

The present invention provides a method of making a Sb-$MO_x$—C nanocomposite by providing a nanocomposite comprising a $Sb_2O_3$ source, a M source, and a C source; milling the nanocomposite by a high-energy mechanical milling process to form a Sb-$MO_x$—C nanocomposite having a nanostructured Sb dispersion in a matrix of an amorphous M-oxide and a conductive carbon. In some embodiments, the M source is Al and the amorphous M-oxide is $Al_2O_3$; M source is Ti and the amorphous M-oxide is $TiO_2$; or the M source is Mo and the amorphous M-oxide is $MoO_3$. The C source may include acetylene black, graphene, graphite, hard carbon, or other forms of carbon or carbon containing precursors like glucose and sucrose.

The present invention provides a method of making a Sn-$MC_x$—C nanocomposite by heating a mixture of a Sn source and a M source; and milling the Sn-M with a carbon source by a high-energy mechanical milling process to form a Sn-$MC_x$—C nanocomposite dispersion. In some embodiments, the M source is Ti to form a Sn—$TiC_x$—C nanocomposite; the M source is V to form a Sn—$VC_x$—C nanocomposite; the M source is Cr to form a Sn—$CrC_x$—C nanocomposite; the M source is Mn to form a Sn—$MnC_x$—C nanocomposite; the M source is Fe to form a Sn—$FeC_x$—C nanocomposite; the M source is Mo to form a Sn—$MoC_x$—C nanocomposite; the M source is W to form a Sn—$WC_x$—C nanocomposite; the M source is Al to form a Sn—$AlC_x$—C nanocomposite; or the M source is Si to form a Sn—$SiC_x$—C nanocomposite.

The present invention provides a method of making a Sn-$MC_x$—C electrode by forming a Sn-$MC_x$—C nanocomposite by heating a mixture of a Sn source and a M source and milling the mixture with a carbon source by a high-energy mechanical milling process to form a Sn-$MC_x$—C nanocomposite; mixing a slurry of a carbon black source, a polyvinylidene fluoride source, and Sn-$MC_x$—C nanocomposite in N-methylpyrrolidinone; coating the slurry on a substrate; and curing the slurry coating to form a Sn-$MC_x$—C electrode. The M source may be selected from the group consisting of Ti, V, Cr, Mn, Fe, Mo, W, Al, Si, or combinations thereof.

The present invention provides a method of making a Sb-$MO_x$—C electrode by forming a Sb-$MO_x$—C nanocomposite by milling a $Sb_2O_3$ source, a M source, and a C source to form a Sb-$MO_x$—C nanocomposite; mixing a slurry of a carbon black source, a polyvinylidene fluoride source, Sb-$MO_x$—C nanocomposite in N-methylpyrrolidinone; coating the slurry on a substrate; and curing the slurry coating to form a Sb-MO$_x$—C electrode. M may be selected from the group consisting of Al, Mg, Ti, V, Cr, Mn, Fe, Co, Ni, Zr, Mo, W, Nb, Ta, or combinations thereof.

BRIEF DESCRIPTION OF THE DRAWINGS

Advantages of the present invention will become apparent to those skilled in the art with the benefit of the following detailed description of embodiments and upon reference to the accompanying drawings in which.

Figure 1:
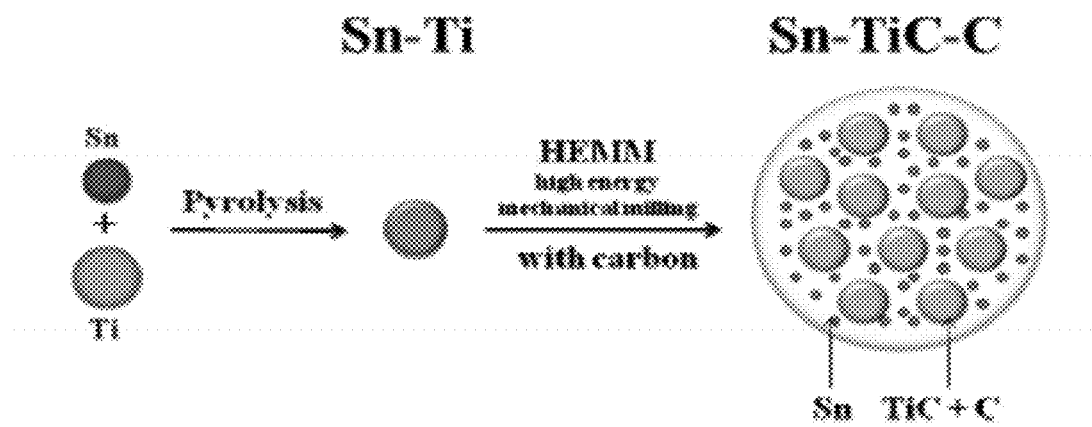
FIG. 1 shows the synthetic scheme employed to obtain the Sn—TiC—C nanocomposite.

While the invention may be susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF THE PREFERRED EMBODIMENTS

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of this invention, a number of terms are defined below. Terms defined herein have meanings as commonly understood by a person of ordinary skill in the areas relevant to the present invention. Terms such as "a", "an" and "the" are not intended to refer to only a singular entity, but include the general class of which a specific example may be used for illustration. The terminology herein is used to describe specific embodiments of the invention, but their usage does not delimit the invention, except as outlined in the claims.

The present invention describes the design and the preparation of new nanocomposite anode materials having the general formula Sn-MC$_x$—C (M=elements such as Ti, V, Cr, Mn, Fe, Mo, W, Al, Si, etc . . . ) and Sb-MO$_x$—C (M metals like Al, Mg, Ti, V, Cr, Mn, Fe, Co, Ni, Zr, Mo, W, Nb, Ta, etc . . . ). The nanocomposites are prepared by mechanochemical (ball milling) method. The MC$_x$—C or MO$_x$—C present in the nanocomposite anode of the present invention act as a buffer to accommodate volume changes thereby alleviating the huge volume expansion encountered with alloy anodes during the charge-discharge process. The nanocomposite anode materials of the present invention have an excellent cycle life and overcomes the problem of degradation in electrochemical performance during cycling that is seen with the traditional alloy anodes that are used in lithium ion batteries.

In this regard, several lithium alloy anode materials Li$_x$M$_y$ have attracted much attention due to their high capacity values. For example, LiAl (993 mAhg$^{-1}$), Li$_{3.75}$Si (3589 mAhg$^{-1}$), Li$_{3.75}$Ge (1385 mAhg$^{-1}$), Li$_{4.4}$Sn (993 mAhg$^{-1}$), Li$_3$Sb (660 mAhg$^{-1}$), with theoretical capacity values exceeding that of graphite anode have been pursued. These alloy anodes also offer an added advantage of better safety than graphite due to their operating voltage well above that of Li/Li$^+$ and less surface reactivity with the electrolyte. Antimony alloys are appealing as they offer high theoretical capacity (gravimetric and volumetric) and an operating voltage well above that of metallic lithium. Unfortunately, the reaction of Sb with lithium to form Li$_3$Sb is accompanied by a large volume change of 137 percent, which results in cracking and crumbling of the alloy particles, disconnection of the electrical contact between the particles and current collectors, and consequent capacity fade during cycling. To alleviate this problem, Sb-containing intermetallic compounds such as Cu$_2$Sb, CoSb, CrSb, and MnSb, in which only Sb is electrochemically active, SnSb, InSb, Zn$_4$Sb$_3$, and AlSb, in which both the metals are electrochemically active with different lithium reaction mechanisms, have been pursued. However, most of these intermetallic alloy anodes still exhibit capacity fade. Unfortunately, the use of these alloy anodes in practical lithium ion cells has been plagued by severe capacity fade, arising from a huge volume change occurring during the charge-discharge (lithium alloying/ dealloying) process. The volume change leads to lattice stress and consequent cracking and crumbling of the alloy particles during cycling, resulting in abrupt loss in capacity within a few charge-discharge cycles. To overcome this problem, significant effort has been focused on buffering the volume expansion by using nanostructured materials and active-inactive composite materials. Although the nanostructured materials are expected to offer shorter diffusion length for lithium ions and accommodate the strain occurring during cycling, the large surface-to-volume ratio and the high surface reactivity pose difficulties. The active-inactive composite strategy, on the other hand, involves a mixture of two materials, one reacting with lithium while the other acting as an electrochemically inactive matrix to buffer the volume change during the charge-discharge cycling. This strategy has been applied to several Sn-M-C systems with M=Ti, V, Cr, Mn, Fe, and Co and found an enhancement in cycling performance compared to the original alloys. As a consequence of these efforts, Sony Corporation introduced recently a new lithium-ion battery called Nexelion, which uses amorphous Sn—Co—C composite as the anode. While the Sn—Co—C anode exhibits excellent cycling performance, the strategy was not successful with the other Sn-M-C systems. Moreover, Co is expensive and toxic, and the use of Co both in the anode and cathode for large battery applications could lead to a rapid increase in cost.

The present invention describes novel Sn—TiC—C and Sb-MO$_x$—C (M=Al, Ti, and Mo) nanocomposites, which exhibit excellent capacity retention with high capacity and rate capability. The Sb-MO$_x$—C nanocomposites have been synthesized by a mechanochemical reduction of Sb$_2$O$_3$ with, respectively, Al, Ti, and Mo in presence of carbon (acetylene black). These composite electrodes exhibit excellent electrochemical cycling performance and rate capability compared to pure Sb in lithium cells. The Sb-MO$_x$—C(M=Al, Ti, or Mo) nanocomposite anodes of the present invention, have several advantages: (i) dispersion of ultrafine Sb metal particles in the MO$_x$—C ceramic matrix that acts as a buffer and reduce the volume expansion and (ii) low irreversible capacity loss in the first cycle as the formation of Li$_2$O is avoided. The Sb-MO$_x$—C nanocomposites are prepared by a simple high-energy mechanical milling (HEMM) of Sb$_2$O$_3$ with M (M=Al, Ti, or Mo) and C. The ultrafine Sb particles dispersed in the MO$_x$—C ceramic matrix are characterized by X-ray diffraction (XRD), transmission electron microscopy (TEM), X-ray photoelectron spectroscopy (XPS), and electrochemical charge-discharge measurements including impedance analysis. The XRD, XPS, TEM, and STEM data reveal that these nanocomposites are composed of uniformly dispersed nanostructured Sb in the amorphous Al$_2$O$_3$, TiO$_2$, or MoO$_3$ matrix along with conductive carbon.

FIG. 1 shows the synthesis process employed to obtain the Sn—TiC—C nanocomposite. The Sn—Ti (1:3 atom ratio) alloy was obtained by heating a mixture of Sn and Ti powders mixed with 20 weight percent carbon (acetylene black) followed by a high energy mechanical milling (HEMM), during which the Ti in Sn—Ti reacted with the carbon to produce TiC and consequently the Sn—TiC—C composite.

Figure 2:
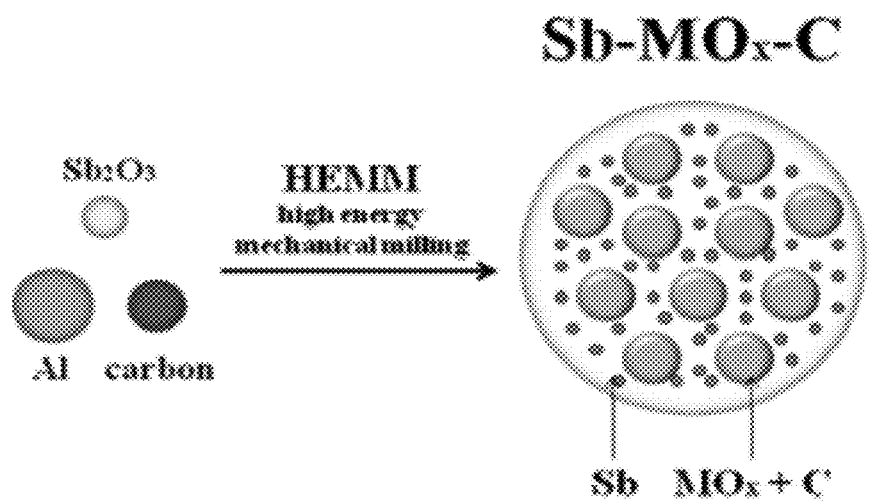
FIG. 2 is a schematic description of the Sb-MO$_x$—C (M=Al and Ti) nanocomposites.

FIG. 2 is a schematic description of the Sb-MO$_x$—C (M=Al and Ti) nanocomposites. Synthesis of the Sn—TiC—C nanocomposite: The Sn—Ti (1:3 atomic ratio) alloy powders were obtained by heating a mixture of required amounts of Sn (99.9+%, <45 μm, Aldrich) and Ti (99.8%, <45 μm, Aldrich) powders at 600 C. in a flowing argon atmosphere for 12 h. The Sn—Ti alloy thus obtained was then ground and sieved to obtain particles smaller than 75 μm. The Sn—Ti alloy with <75 μm size was then mixed with required amount of acetylene black and subjected to high energy mechanical milling (HEMM) for 40 hours with a speed of 500 rpm in a vibratory mill at ambient temperature under argon atmosphere to obtain Sn—TiC—C. The milling was carried out in a hardened steel vial having a capacity of 80 cm$^3$ with a ball-to-powder ratio of 20:1 and ball diameters of ⅜ and 3/16 inch. The optimum weight ratio between the Sn—Ti alloy and carbon (acetylene black) was 80:20, and all the data in the present disclosure refer to samples prepared with a Sn—Ti:C weight ratio of 80:20. The samples were then analyzed by energy dispersive spectroscopy (EDS) attached to a JEOL 5610 scanning electron microscope (SEM) to detect any contamination from the steel balls. The analysis indicated only <0.5 weight percent iron in the Sn—TiC—C samples.

Electrochemical Measurements: The electrodes for the electrochemical evaluation were prepared by mixing 70 weight percent active material (Sn—TiC—C) powder, 15 weight percent carbon black (Super P), and 15 weight percent polyvinylidene fluoride (PVDF) dissolved in N-methylpyrrolidinone (NMP) to form a slurry, followed by coating on a copper foil, pressing, and drying at 120° C. for 3 hours under vacuum. The electrodes were then assembled into CR2032 coin cells in an Ar-filled glove box using Celgard polypropylene separator, lithium foil as the counter electrode, and 1 M LiPF$_6$ in ethylene carbonate (EC)/diethyl carbonate (DEC) (1:1 v/v) electrolyte. The discharge-charge experiments were performed galvanostatically at a constant current density of 100 mA/g of active material within the voltage range of 0-1.5 V vs. Li/Li$^+$.

Material Characterization: The Sn—TiC—C nanocomposite samples were characterized with a Phillips X-ray diffractometer with Cu Kα radiation (λ=1.5418Å), Kratos X-ray photoelectron spectrometer (XPS), and JEOL 3010 transmission electron microscope (TEM) operating at 300 kV. The TEM samples were prepared by dispersing the sample in acetone or hexane, dropping it onto a carbon-coated copper grid, and drying the solvent at ambient temperature. The carbon present in the composite was characterized by Renishaw Raman spectroscopy using a 514 nm laser excitation. Structural changes occurring during the charge-discharge process were assessed by detaching the electrodes from the cell, protecting it with a Kapton tape to prevent contamination from air, and then examining it with ex situ XRD.

Figure 3A:
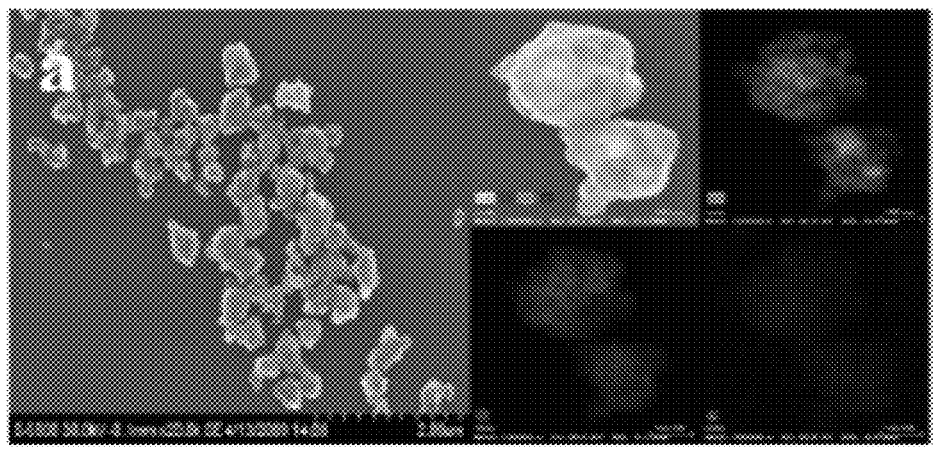
FIG. 3A shows STEM images and FIG. 3b shows TEM images of the Sn—TiC—C nanocomposite. Also shown are the fast Fourier transform images over selected regions.
Figure 3B:
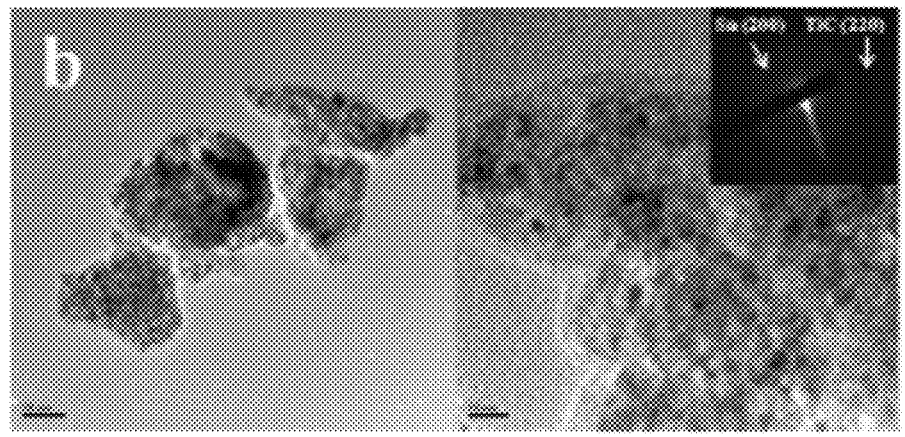

The scanning transmission electron microscopy (STEM) images shown in FIG. 3A reveals an average particle size of about 300 nm and a homogeneous distribution of Sn, Ti, and C in the Sn—TiC—C nanocomposite. FIG. 3B shows the transmission electron microscopy (TEM) images of the nanocomposite along with selected area diffraction. While the diffraction data reveal the absence of any crystalline phase, the diffraction rings shown in the inset of FIG. 3B could be indexed to be Sn and TiC. The amorphous nature of the active material Sn dispersed homogeneously in the amorphous, conductive buffer matrix TiC+C may be beneficial to achieve good electrical contact with the current-collector as well as to absorb smoothly the volume expansion-contraction occurring during cycling.

Figure 4:
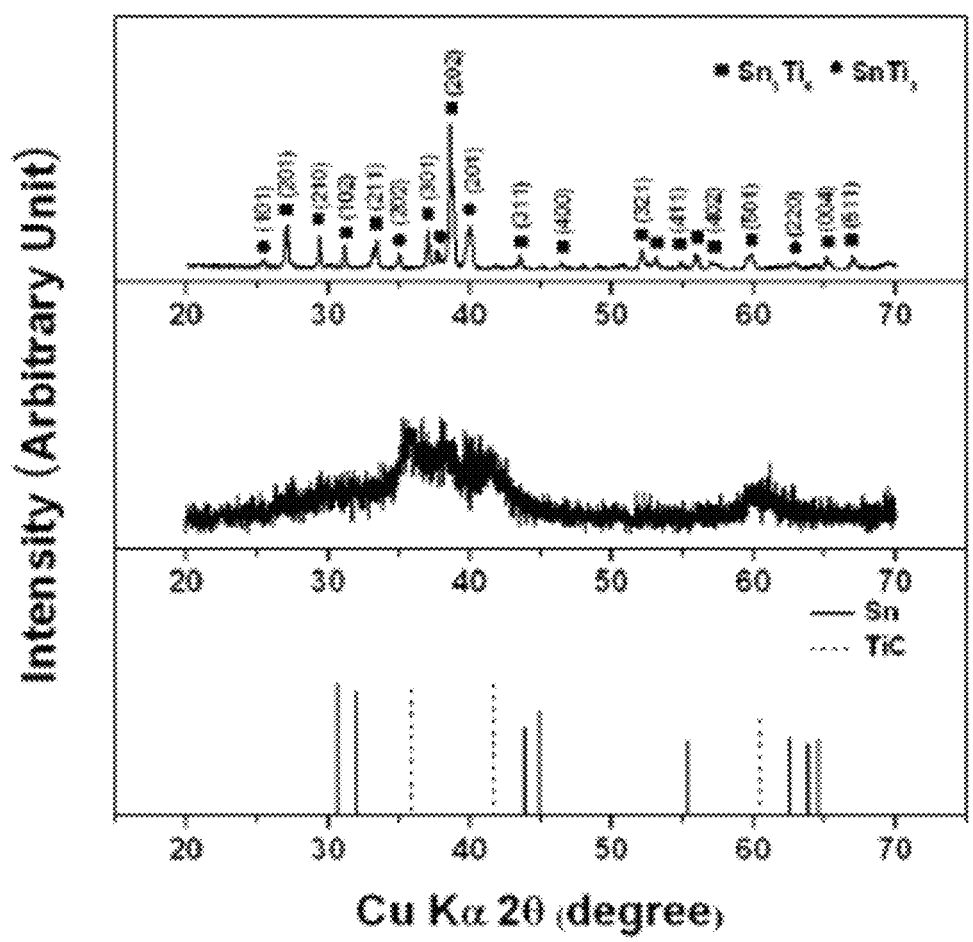
FIG. 4 shows the XRD patterns of the Sn—Ti alloy and Sn—TiC—C nanocomposite.

FIG. 4 shows the XRD patterns of the Sn—Ti alloy and the Sn—TiC—C nanocomposite. While Sn—Ti alloy (Top graph) shows reflections corresponding to Sn$_5$Ti$_6$ (JCPDS No. 18-1390) and SnTi$_3$ (JCPDS No. 06-0583), the Sn—TiC—C nanocomposite (Middle graph) exhibits broad peaks corresponding to TiC without any detectable peaks corresponding to Sn, confirming the amorphous nature of Sn revealed by the TEM data in FIG. 3B.

Figure 5:
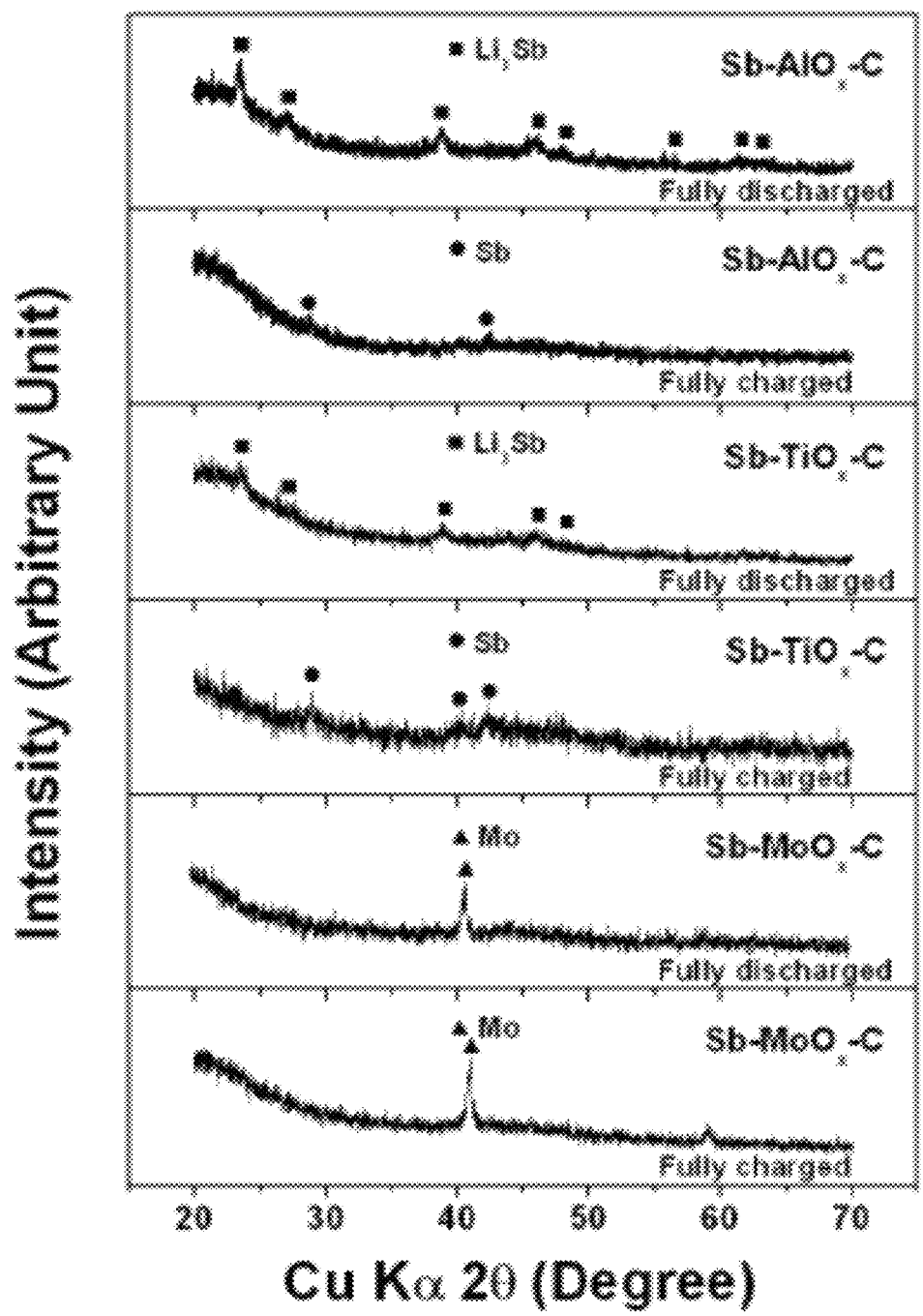
FIG. 5 shows the XRD patterns of pristine Sb$_2$O$_3$ and Sb-MO$_x$—C (M=Al, Ti, and Mo) nanocomposites obtained by the mechanochemical reduction reaction.

FIG. 5 shows the XRD patterns of pristine $Sb_2O_3$ and $Sb-MO_x$—C (M=Al, Ti, and Mo) nanocomposites obtained by the mechanochemical reduction reaction.

Figure 6:
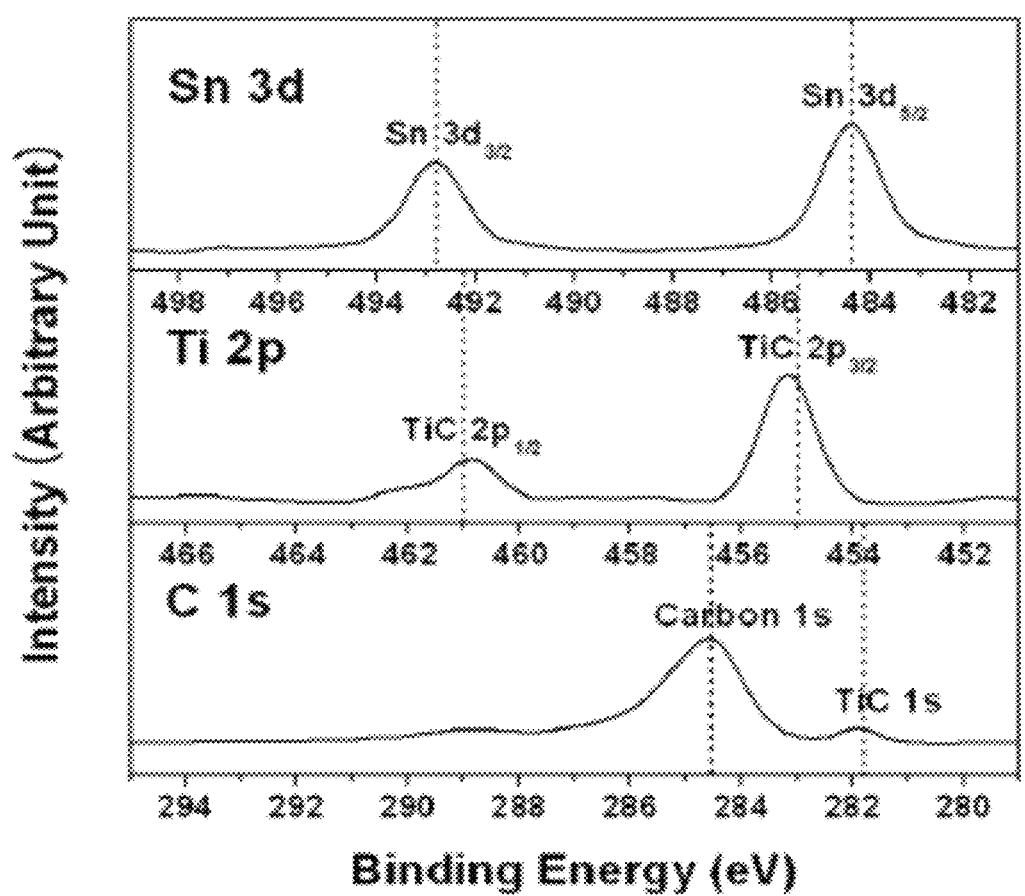
FIG. 6 is the XPS spectra of the Sn—TiC—C nanocomposite showing the Sn 3d, Ti 2p, and C 1s peaks.

To characterize the amorphous phases present, the Sn—TiC—C nanocomposites were analyzed by X-ray photoelectron spectroscopy (XPS) and Raman spectroscopy. While the Sn $3d_{5/2}$ and $3d_{3/2}$ peaks observed, at 484.5 eV and 493 eV, respectively, confirmed the presence of metallic Sn, the Ti $2p_{3/2}$ and $2p_{1/2}$ peaks observed, at 455 eV and 461 eV, respectively, confirmed the presence of TiC (FIG. 6). The TiC was formed by a dealloying of Ti from the $Sn_5Ti_6$ and $SnTi_3$ lattices and reaction with carbon during the HEMM process. The C 1s peaks at 284.5 and 228 eV, correspond, to carbon and TiC, respectively. Based on the amount of Ti in the reaction mixture, the amount of the TiC phase in the Sn—TiC—C nanocomposite is estimated to be 54.7 weight percent.

Figure 7:
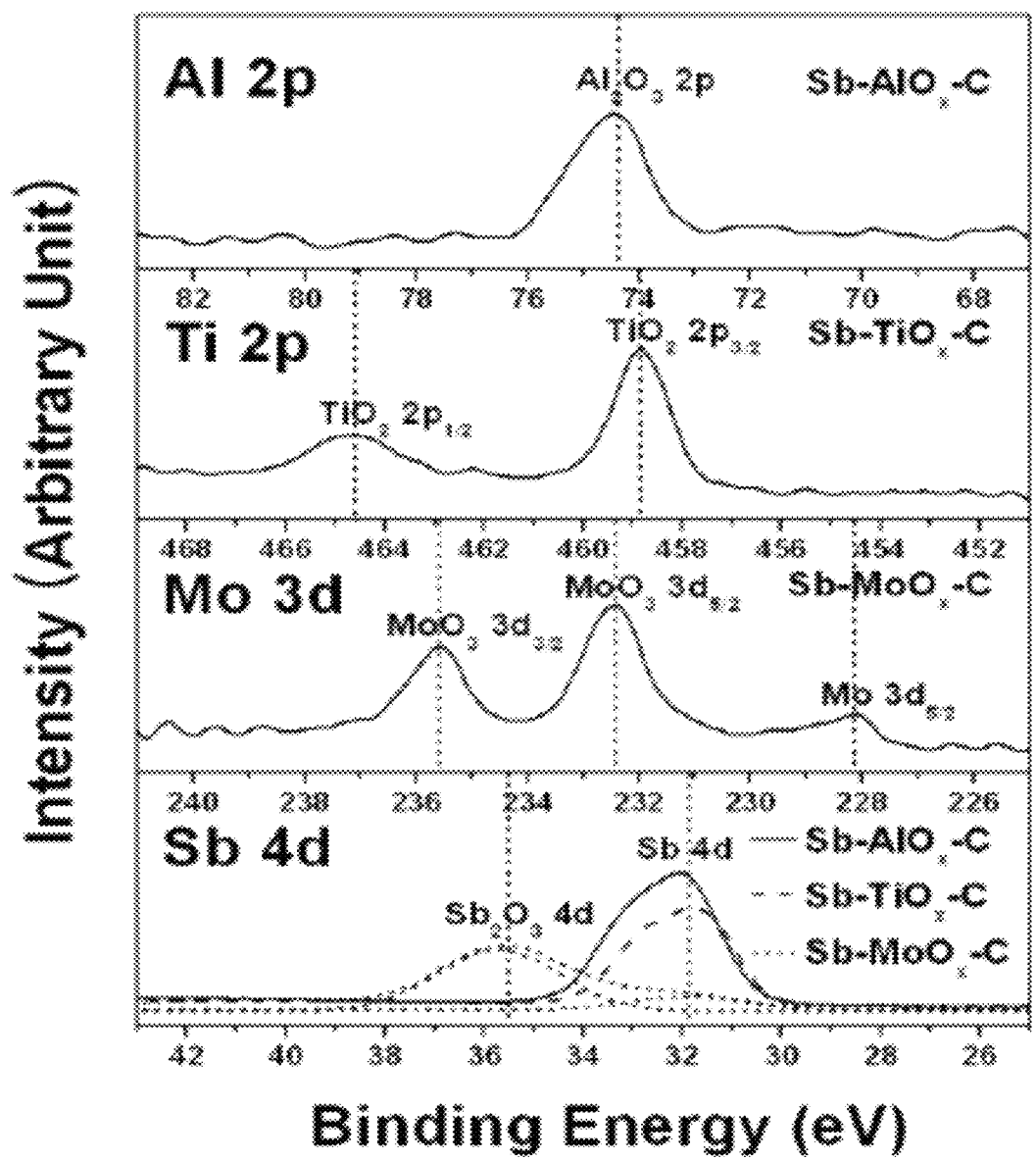
FIG. 7 is the XPS spectra of the Sb-MO$_x$—C (M=Al, Ti, and Mo) nanocomposites.
Figure 8:
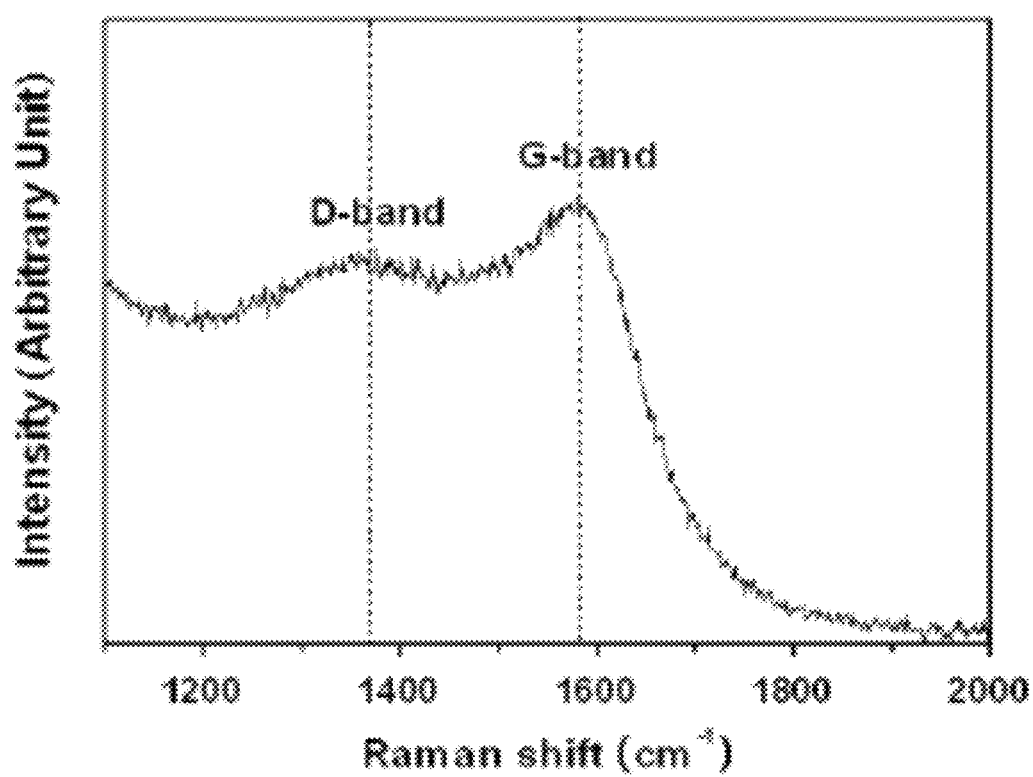
FIG. 8 depicts the Raman spectrum of the Sn—TiC—C nanocomposite.

FIG. 7 is the XPS spectra of the $Sb-MO_x$—C (M=Al, Ti, and Mo) nanocomposites. Raman spectroscopy was used to analyze the nature and ordering of carbon as shown in FIG. 8. The modes at 1582 and 1357 $cm^{-1}$ correspond, respectively, to the G (ordered) and D (disordered) bands. The integrated intensity ratio $I_D/I_G$ is an indication of the degree of graphitization. A high intensity ratio of 0.9 compared to 0.09 in ordered synthetic graphite indicates a higher degree of disorder in the carbon present in the Sn—TiC—C nanocomposite. The combination of TEM, XRD, XPS, and Raman spectroscopic data confirmed the presence of amorphous metallic Sn, amorphous or poorly crystalline TiC, and amorphous carbon in the Sn—TiC—C nanocomposite obtained by the HEMM process.

Figure 9A:
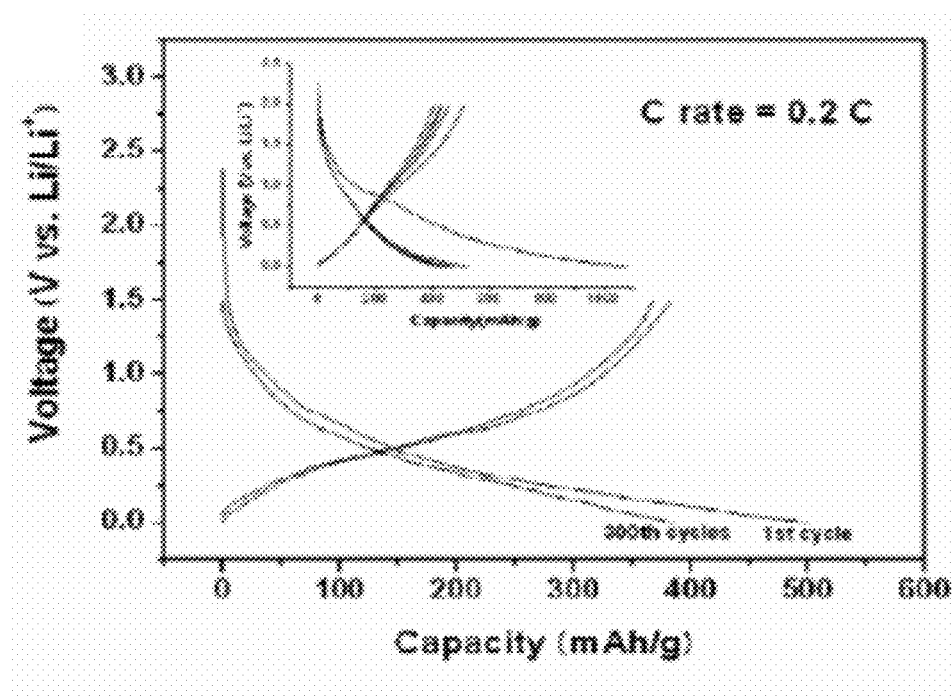
FIG. 9A shows the discharge-charge profiles and FIG. 9B shows differential capacity plots (DCP) of the Sn—TiC—C nanocomposites. The inset in FIG. 9A shows the first discharge-charge profiles of milled carbon (acetylene black) cycled at a rate of C/2.

The voltage profiles of the Sn—TiC—C nanocomposite are shown in FIG. 9A. The nanocomposite exhibited a first discharge and charge capacity of, 501 and 367 mAh/g, respectively, implying an irreversible capacity loss of 134 mAh/g and a coulombic efficiency of 74 percent in the first cycle. The irreversible capacity loss is associated with the reduction of the electrolyte on the active material surface and the formation of solid-electrolyte interfacial (SEI) layer. To determine the contribution of acetylene black to the capacity, the inventors investigated the electrochemical behavior of acetylene black after milling under identical conditions. The inset in FIG. 9A shows the discharge-charge profiles of the ball milled acetylene black. It exhibits a first discharge capacity of about 100 mAh/g, which decreases approximately to one-third in the following cycles.

Figure 9B:
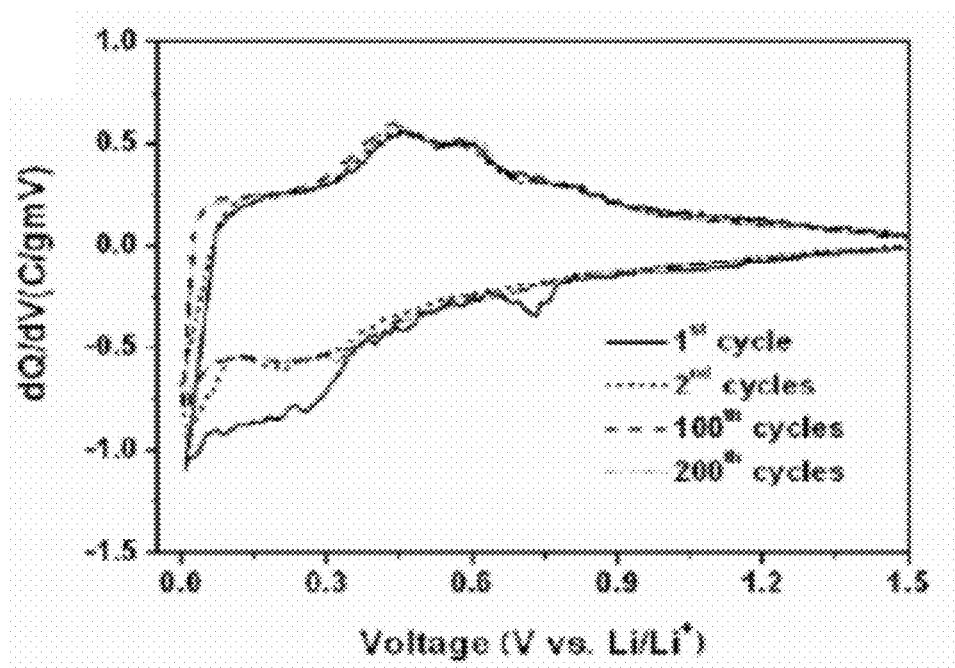

The differential capacity plots (DCP) at various cycles were analyzed (FIG. 9B) to fully understand the discharge-charge process. The alloying/dealloying of lithium with Sn and carbon over a potential range of 1.5 to 0.0 V (vs. Li/Li$^+$) yielded $Li_xSn$ (x≤4.4) alloys and $Li_yC$. The DCPs showed broad peaks, which are characteristic of the reaction of amorphous Sn, instead of clear voltage plateaus characteristic of crystalline Sn. During first discharge, the electrolyte decomposes at approximately 0.75 V to form an SEI layer on the surface of the active material. During charge near 0.75 V, the metallic Sn is generally expected to aggregate into large tin clusters as the number of cycle increases. As a result, the capacity retention is expected to decrease as the electrode is cycled since the large tin regions are more sensitive to cracking and crumbling. In contrast, the DCPs are rather smooth in FIG. 9B and they overlap with each other after the first cycle, reflecting the excellent reversible nature of the process. The presence of a large amount of amorphous TiC along with carbon as a conductive buffer matrix suppresses the aggregation of the Sn atoms and imparts good reversibility.

Figure 10A:
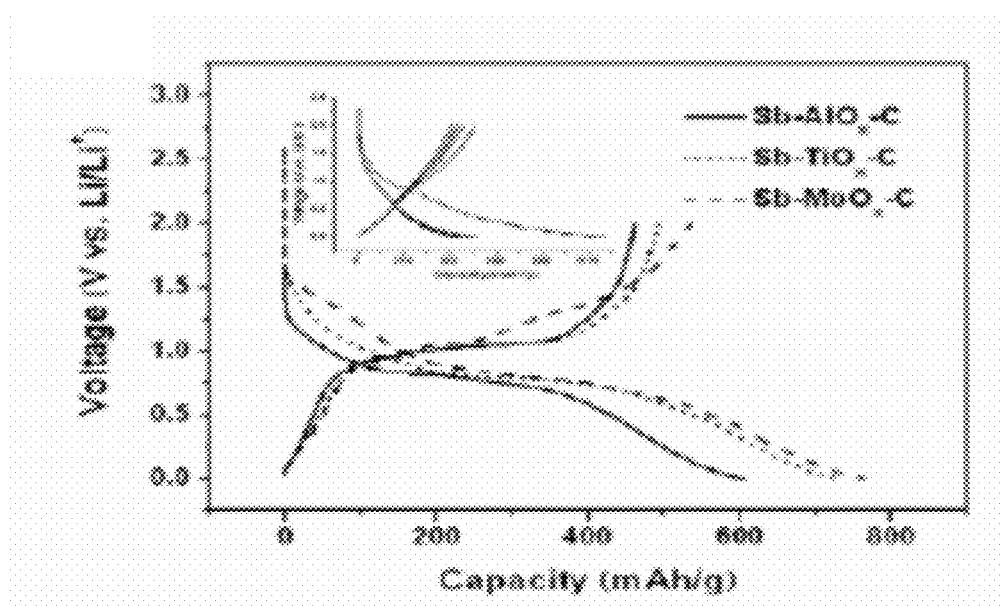
FIG. 10A is a comparison of the discharge-charge profiles and FIG. 10B is a comparison of the differential capacity plots (DCP) of the Sb-MO$_x$—C (M=Al, Ti, and Mo) nanocomposites.
Figure 10B:
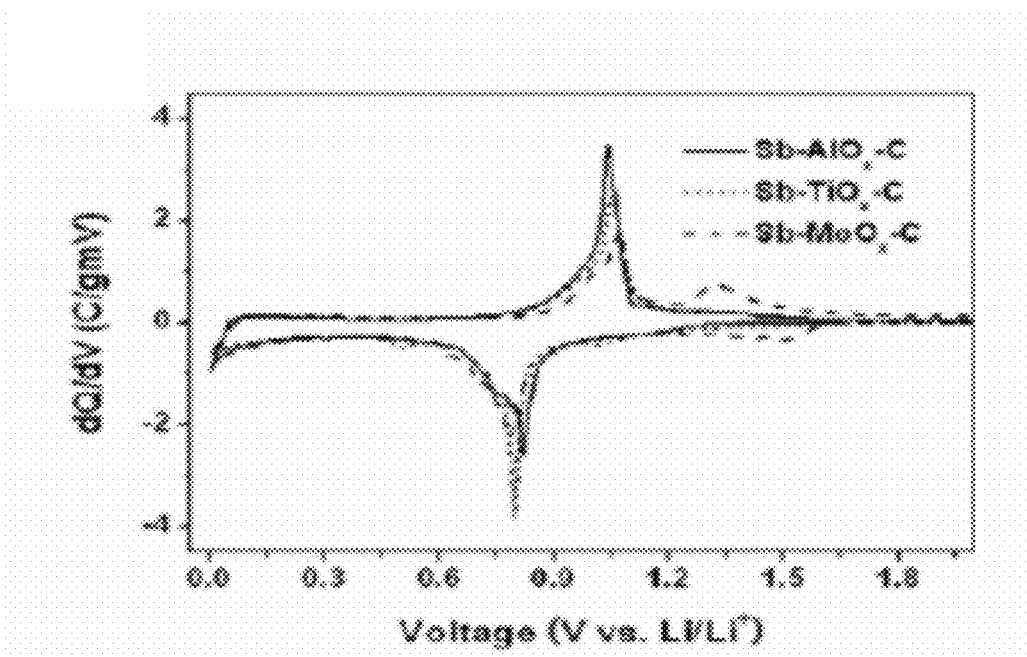

FIG. 10A is a comparison of the discharge-charge profiles and FIG. 10B is a comparison of the differential capacity plots (DCP) of the $Sb-MO_x$—C (M=Al, Ti, and Mo) nanocomposites.

Figure 11A:
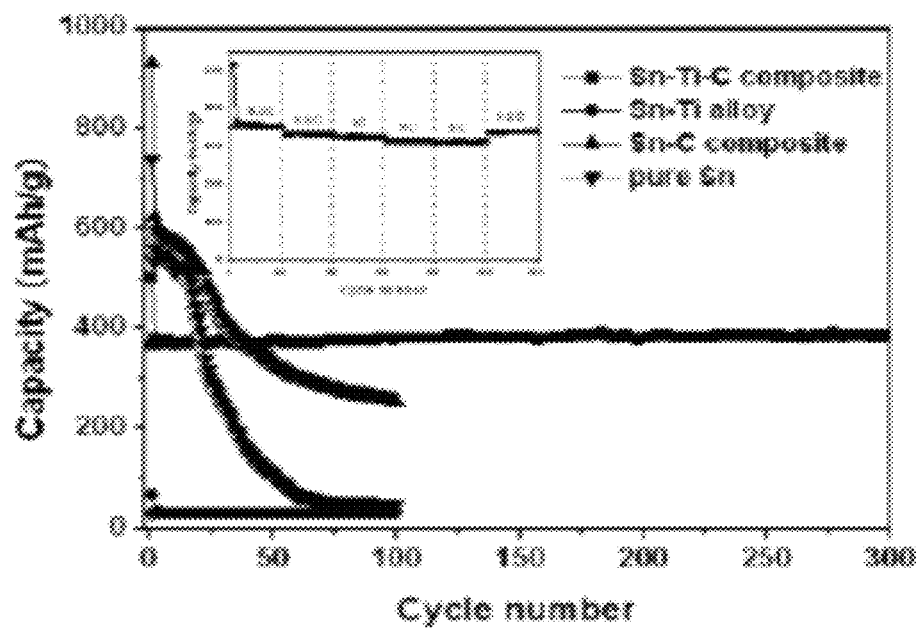
FIG. 11A shows the comparison of the cycling performances of Sn—TiC—C nanocomposite with those of Sn, Sn—C, and Sn—Ti

A comparison of the cycle performances of Sn, Sn—C, Sn—Ti alloy, and Sn—TiC—C nanocomposite electrodes are shown in FIG. 11A. The data were collected between 0.0 and 1.5 V at a constant current of 100 mA/g. The pure Sn and Sn—C composite exhibited a continuous capacity fade within 50 cycles. The Sn—Ti alloy electrode exhibited a first discharge and charge capacities of, 68 and 29 mAh/g, respectively, which is related mainly to the insertion of lithium into the conducting carbon (Super P). The Sn—TiC—C nanocomposite electrode, on the other hand, shows excellent cyclability compared to pure Sn. The excellent cyclability is related to the amorphous nature of tin in the Sn—TiC—C nanocomposite, which is consistent with recent reports that amorphous or nanostructured alloy materials give the best capacity retention as they may accommodate the volume changes more homogeneously. After the first cycle, the coulombic efficiency remains stable, indicating that the TiC+C conductive buffer matrix suppresses the aggregation of the Sn atoms. Also, these buffer materials along with the amorphous morphology of Sn are able to absorb better the volume changes. The Sn—TiC—C composite retains a capacity of 383 mAh/g after 300 cycles without any noticeable capacity fade. The Sn—TiC—C nanocomposite also exhibits excellent rate capability as shown in the inset in FIG. 11A. For example, it retains a high capacity of about 320 and 315 mAh/g, respectively, at 3C and 5C rates.

Figure 11B:
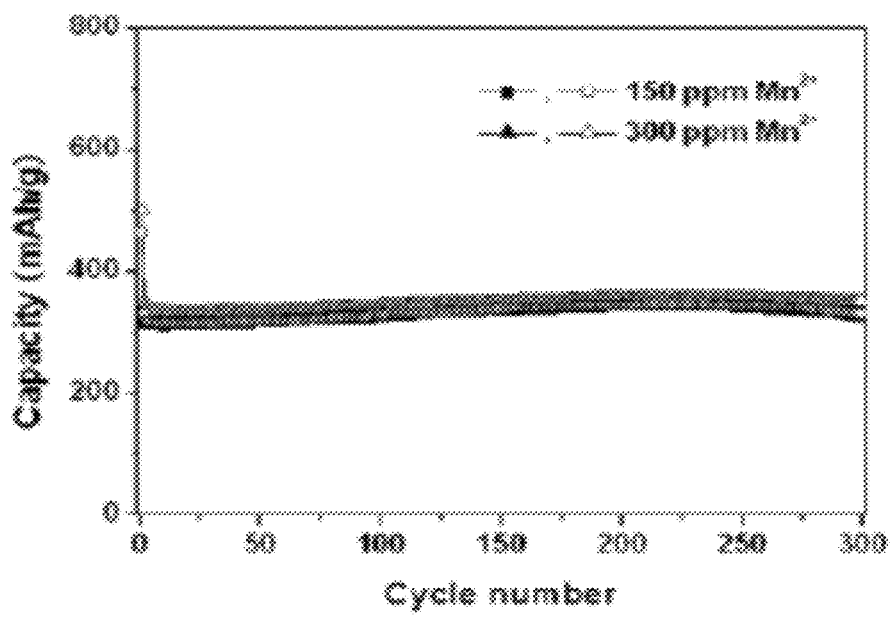
FIG. 11B shows the cycling performances of Sn—TiC—C nanocomposite in presence of 150 ppm and 300 ppm Mn$^{2+}$ in the electrolyte. The inset in FIG. 11A shows the discharge capacity of Sn—TiC—C nanocomposite vs. cycle number at various C rates.

One of the difficulties with the $LiMn_2O_4$ spinel cathodes is the poisoning of the carbon anode by the dissolved $Mn^{2+}$ ions from the cathode lattice. Accordingly, the cyclability of the Sn—TiC—C nanocomposite anodes in presence of 150 and 300 ppm $Mn^{2+}$ in the electrolyte was studied, i.e. the studies were carried out by intentionally adding required amount of anhydrous manganese perchlorate salt to the electrolyte (to give 150 and 300 ppm $Mn^{2+}$) before assembling the cell. As seen in FIG. 11B, the cyclabilities of the nanocomposite anodes do not differ significantly on adding $Mn^{2+}$, suggesting that the anode may not be poisoned by $Mn^{2+}$ and they may be employed with manganese spinel cathodes in lithium ion cells.

The novel Sn—TiC—C nanocomposite anodes offer several advantages: (i) the entire synthesis procedure is simple and it can be easily scaled up; (ii) the nanocomposite is free from the expensive cobalt unlike Sn—Co—C anode commercialized recently by Sony in 2005; (iii) the amorphous tin in the nanocomposite alleviates the pulverization and the growth of Sn grains; (iv) the nanosize nature of all the components present in the Sn—TiC—C nanocomposite is helpful to achieve fast electron and lithium ion conduction; (v) the amorphous TiC and carbon phases act as a buffer to mitigate the aggregation of tin nanoparticles and the volume expansion during the discharge-charge cycles. This type of amorphous Sn—TiC—C nanocomposites has great potential as anode materials in lithium-ion batteries.

The Sn—TiC—C nanocomposite of the present invention can be synthesized by a facile, inexpensive high energy mechanical milling process and investigated as an anode material in lithium ion cells. Characterization data collected with STEM, TEM, XRD, and XPS reveals an uniform dispersion of amorphous Sn nanoparticles within the conductive, amorphous (or poorly crystalline) TiC+carbon matrix. The nanocomposite exhibited superior capacity retention over 300 cycles with a capacity of about 370 mAh/g and a much higher volumetric capacity than a graphite anode. The superior electrochemical performance of the nanocomposite electrode is attributed to the amorphous nature of Sn, suppression of Sn grain growth, and buffering effect provided by the conductive TiC+C matrix toward the volume expansion-contraction during cycling.

The Sb-$MO_x$—C (M=Al, Ti, or Mo) nanocomposites of the present invention were obtained by a reduction of $Sb_2O_3$ (99.6%, Alfa) by Al (99.9%, 20 μm, Aldrich), Ti (99.9%, 150 μm, Aldrich), or Mo (99.9+%, 2 μm, Aldrich) metal powders in presence of carbon (acetylene black) with a high energy mechanical milling (SEPX vibratory mill) process at ambient temperature as illustrated by reactions 1-3 below:

$$Sb_2O_3 + 2Al \rightarrow 2Sb + Al_2O_3 (\Delta G° = -944 \text{ kJ/mol}) \quad (1)$$

$$2Sb_2O_3 + 3Ti \rightarrow 4Sb + 3TiO_2 (\Delta G° = -1384 \text{ kJ/mol}) \quad (2)$$

$$2Sb_2O_3 + 3Mo \rightarrow 4Sb + 3MoO_2 (\Delta G° = -315 \text{ kJ/mol}) \quad (3)$$

The negative free energy changes make the reduction reactions 1-3 spontaneous. Required quantities of $Sb_2O_3$ and M (in accordance with reactions 1-3) were mixed with acetylene black to offer a Sn—Ti:C weight ratio of 80:20 and then loaded with steel balls (diameter: ½ and ¼ inch) into a hardened steel vial having a capacity of 80 $cm^3$ with a ball-to-powder ratio of 10:1 inside an argon-filled glove box. The steel vial was then subjected to the high energy ball milling for 12 hours at a speed of 500 rpm. In order to check for iron contamination from the steel balls and vials, the samples were analyzed by energy dispersive spectroscopy (EDS) attached to a scanning electron microscope (SEM); the EDS data indicated a very low Fe concentration of about 0.5 weight percent.

The phase analysis of the synthesized samples was performed with a Phillips XRD and Cu Kα radiation. The morphology, microstructure, and composition of the synthesized powders were examined with a Hitachi S-5500 scanning transmission electron microscope (STEM) and JEOL 2010F transmission electron microscope (TEM). Surface characterizations were carried out with a Kratos X-ray photoelectron spectrometer (XPS) with monochromatic Al Kα source.

The electrodes for the electrochemical evaluation were prepared by mixing 70 weight percent active material (Sb-$MO_x$—C) powders, 15 weight percent carbon black (Denka black) as a conducting agent, and 15 weight percent polyvinylidene fluoride (PVDF) dissolved in N-methylpyrrolidinone (NMP) as a binder to form a slurry, followed by coating on a copper foil, pressing, and drying at 120° C. for 3 hours under vacuum. The CR2032 coin cells were assembled in an Ar-filled glove box using Celgard polypropylene as a separator, lithium foil as the counter electrode, and 1 M $LiPF_6$ in ethylene carbonate (EC)/diethyl carbonate (DEC) (1:1 v/v) as the electrolyte. The discharge-charge experiments were performed galvanostatically at a constant current density of 100 mA/g of active material within the voltage range of 0-2 V vs. Li/$Li^+$. To investigate any structural changes that may occur during electrochemical cycling, ex situ XRD data were collected after detaching the electrodes from the cell and covering it with a polyimide tape as a protective film.

Electrochemical impedance spectroscopic analysis (EIS) was carried out with a Solartron SI1260 equipment by applying a 10 mV amplitude signal in the frequency range of 10 kHz to 0.001 Hz. In the EIS measurements, the Sb-$MO_x$—C nanocomposite with an active material content of about 1.6 mg served as the working electrode and lithium foil served as the counter and reference electrodes. The impedance response was measured after different number of charge-discharge cycles, (after 1 and 20 cycles) at 2 V vs. Li/$Li^+$.

XRD patterns of the Sb-$MO_x$—C nanocomposites obtained by the mechanochemical reduction of $Sb_2O_3$ with Al, Ti, or Mo in presence of acetylene black according to reactions 1-3 are given in FIG. 5. In the case of the nanocomposites with M=Al and Ti, all the diffraction peaks correspond to metallic Sb (JCDPS No. 85-1323). In contrast, the XRD pattern shows reflections corresponding to both metallic Sb and Mo (JCDPS No. 42-1120) in the case of the nanocomposite with M=Mo. In all the three cases, no reflections corresponding to oxides like $Al_2O_3$, $TiO_2$, and $MoO_2$ (or $MoO_3$) could be seen, possibly due to their amorphous or poor crystallinity.

To better characterize the amorphous phases present, all the nanocomposites were analyzed by XPS as shown in FIG. 7. While the Al 2p peak observed at 74.4 eV in the M=Al nanocomposite confirms the presence of $Al_2O_3$, the Ti $2p_{3/2}$ and $2p_{1/2}$ peaks observed, respectively, at 458.7 and 464.5 eV in the M=Ti nanocomposite confirmed the presence of $TiO_2$. The M=Al and Ti nanocomposites also show the Sb 4d peaks corresponding to only metallic Sb at 31.9 eV, confirming the reduction of $Sb_2O_3$ completely to Sb. Thus, the combination of XRD and XPS data confirms the mechanochemical reduction of $Sb_2O_3$ by Al or Ti in the presence of carbon to give Sb+$Al_2O_3$ and Sb+$TiO_2$ in accordance with reactions 1 and 2. The amount of Sb in the nanocomposites in accordance with reactions 1 and 2 is, respectively, 57 and 54 weight percent. However, in case of M=Mo, Mo $3d_{5/2}$ peak corresponding to Mo at 228 eV as well as Mo $3d_{5/2}$ and $3d_{3/2}$ peaks corresponding to $MoO_3$ at, respectively, 232.3 and 235.4 eV are observed in FIG. 7. The formation of $MoO_3$ instead of the anticipated $MoO_2$ (in accordance with reaction 3) is due to the higher negative standard free energy for the formation for $MoO_3$ (−767 kJ/mol) compared to that for $MoO_2$ (−603 kJ/mol). The M=Mo sample also shows broad Sb 4d peaks in FIG. 7 corresponding to both $Sb_2O_3$ and Sb at, respectively, 35.7 and 31.9 eV. Since the amounts of $Sb_2O_3$ and Mo in the reaction mixture were chosen according to reaction 3, part of the Mo metal in the reaction mixture remains unutilized. Also, the presence of $Sb_2O_3$ as indicated by the XPS data reveals that the reduction reaction of $Sb_2O_3$ by Mo may be incomplete under the as the mechanochemical reduction condition. This conclusion is consistent with the XRD peak seen in FIG. 1 for metallic Mo in the M=Mo sample. Thus, the Sb-$MO_x$—C nanocomposite with M=Mo consists of Sb, $Sb_2O_3$, Mo, $MoO_3$, and C unlike the M=Al and Ti cases.

STEM images of the M=Al and Ti samples show that although agglomeration has occurred, the presence of about 500 nm size single particle could be visualized. The reduced Sb, $MO_x$, and carbon are homogeneously dispersed in the nanocomposites. High resolution images of the nanocomposites along with fast Fourier transform (FFT) images corresponding to the selected regions were also taken. The crystalline Sb phase is confirmed by the FFT image, which agrees with the XRD data in FIG. 5. Also, the reduced crystalline Sb phase with a size of 15-20 nm is well surrounded by the amorphous $MO_x$ oxide and carbon phases. This homogeneously mixed morphology as shown by the schematic description in FIG. 2 may be beneficial to provide good electrical contact with the current-collector as well as a buffering effect on the volume expansion-contraction occurring during cycling.

FIG. 10A compares the first discharge-charge profiles of all the three Sb—$Mo_x$—C nanocomposites. The voltage profiles of the M=Al and Ti samples are similar to that observed for a pure Sb electrode, with an average discharge-charge voltage of about 0.9 V. The M=Al and Ti nanocomposites show first discharge capacities of, 607 and 724 mAh/g, respectively, and first charge capacities of, 463 and 491 mAh/g, respectively, implying an initial coulombic efficiencies of, 76 and 68 percent, respectively. The M=Mo nanocomposite exhibits the discharge-charge profiles of both Sb and $Sb_2O_3$ together with first discharge and charge capacities of, 765 and 537 mAh/g, respectively, implying an initial coulombic efficiency of 70 percent. To determine the contribution of acetylene black in the nanocomposites, the inventors studied electrochemical behavior of acetylene black after milling for 12 hours under identical conditions. The inset in FIG. 10A shows the discharge-charge profiles of the ball milled acetylene black. It exhibits a first discharge capacity of about 200 mAh/g, which decreases approximately to one-third in the following cycles as seen in the inset of FIG. 10A. Based on reactions 1 and 2, the expected amounts of $Al_2O_3$ and $TiO_2$ in the M=Al and Ti nanocomposites is, 23 and 26 weight percent, respectively. While $Al_2O_3$ is known to be electrochemically inactive, $TiO_2$ is expected to contribute about 55 mAh/g corresponding to the formation of $Li_xTiO_2$ with x about 0.5.

To fully understand the discharge-charge process, the differential capacity plots (FIG. 10B) of the first cycle were studies for all the three nanocomposites. The differential discharge plot shows a broad peak from 1.3 to 0.8 V, which is related to the formation of solid electrolyte interfacial (SEI) layer due to electrolyte decomposition on the surface of the active material. The major reduction (alloying) and oxidation (dealloying) peaks at, around 0.8 and 1 V, respectively correspond to the reaction of Li with metallic Sb in the Sb-$MO_x$—C nanocomposite. These peaks are shifted slightly compared to that found with pure Sb metal, due to the lowering of electrical conductivity by the ceramic oxide matrix. The electrochemical process of the amorphous carbon with lithium appears as a broad peak below 0.2 V. With the M=Mo nanocomposite, an additional broad reduction and oxidation peak occurs at, respectively, around 1.5 V and 1.3 V due to the reaction of $Sb_2O_3$ with lithium.

Figure 12:
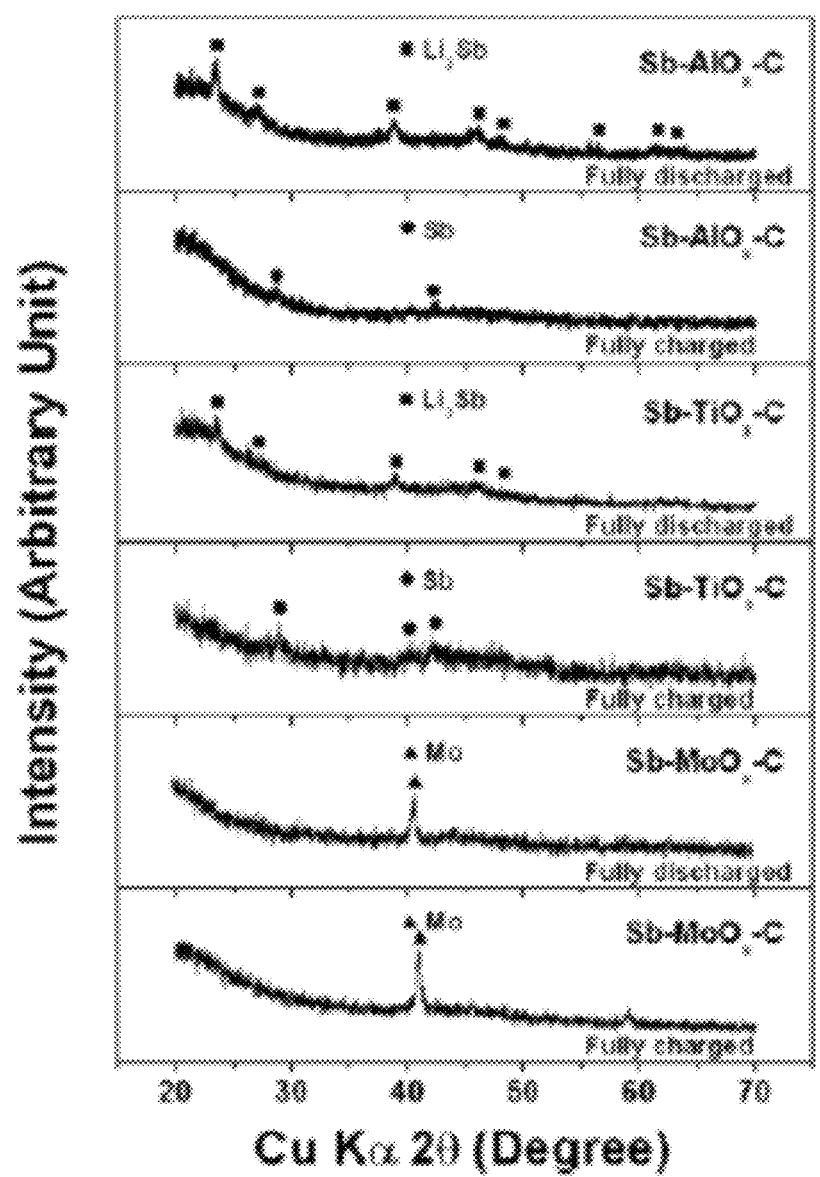
FIG. 12 shows the XRD data of the Sb-MO$_x$—C (M=Al, Ti, and Mo) nanocomposites after first discharge (Li insertion) and after first charge (Li extraction)

FIG. 12 presents an ex situ XRD analysis performed on fully lithiated and delithiated electrodes for all the Sb-$MO_x$—C nanocomposites. The XRD data of the M=Al and Ti nanocomposites show the formation of only $Li_3Sb$ phase at the end of discharge (i.e. when the potential reached 0 V). After the charge, the $Li_3Sb$ phase disappears and only the Sb phase is observed. However, it is rather difficult to identify the $Li_3Sb$ phase in the XRD data of the M=Mo nanocomposite during the first few cycles.

Figure 13A:
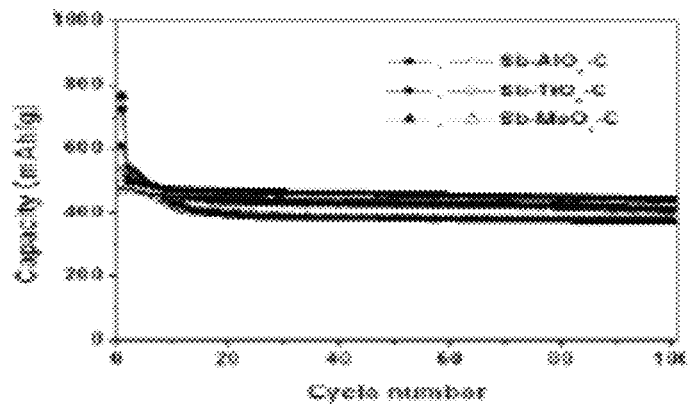
FIG. 13 is a comparison of the cycling performances of the Sb-MO$_x$—C (M=Al, Ti, and Mo) nanocomposites (FIG. 13A) at 25° C., (FIG. 13B) at 55° C., and (FIG. 13C) at 25° C. in presence of 300 ppm Mn$^{2+}$ in the electrolyte electrolyte.
Figure 13B:
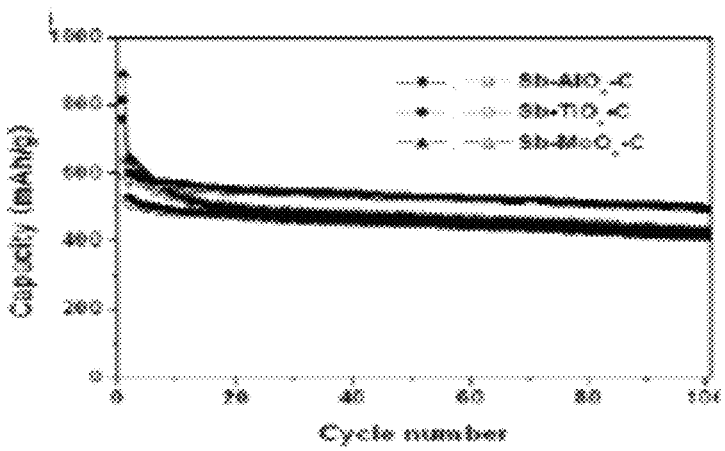
Figure 13C:
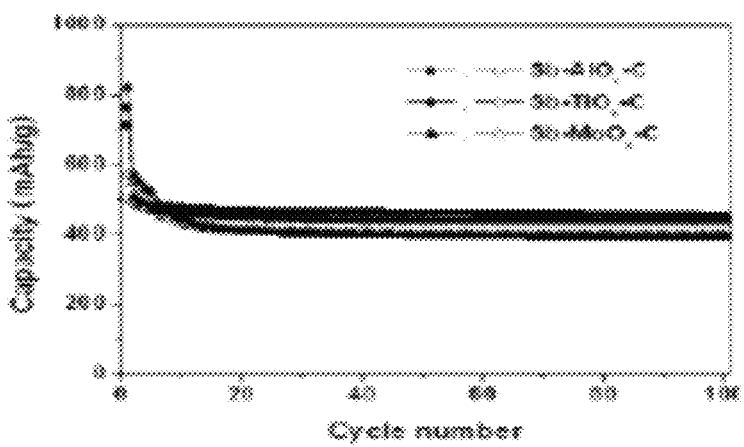

FIG. 13 compares the cyclability of the three Sb-MOx-C nanocomposites between 0 and 2 V at a constant current of 100 mA/g, and Table 1 presents the gravimetric capacity, coulombic efficiency in the 1st cycle, and capacity retention after 100 cycles at various conditions. All the three nanocomposites show good cyclability compared to pure Sb at 25 and 55° C. (FIG. 13A and FIG. 13B). Particularly, the M=Al composite exhibits better capacity retention compared to the M=Ti and Mo nanocomposites. It retains 93 percent capacity after 100 cycles at 25° C. The better performance of the M=Al nanocomposite despite the significantly lower electronic conductivity of $Al_2O_3$ compared to $TiO_2$ or $MoO_3$ may be related to the better mechanical properties of $Al_2O_3$ such as tensile strength and fracture toughness; while $Al_2O_3$ remains as an insulator during the whole charge discharge process, the formation of $Li_xTiO_2$ and $Li_xMoO_3$ during the discharge process can enhance the electronic conductivity. For instance, some reinforced ceramic-metal composites are known to exhibit high strength, modulus, and enhanced resistance to fatigue crack growth. In this system, the enclosure or dispersion of the fine particles of the electrochemically active Sb metal within or among the ceramic oxide and carbon matrix leads to enhanced capacity retention. The ceramic oxide and carbon provide a stable, inactive matrix that buffers against the volume expansion-contraction that occurs during cycling while the conductive carbon offers the necessary electronic conduction.

TABLE 1

Electrochemical performances of the Sb—$MO_x$—C (M = Al, Ti, and Mo) nanocomposites.

| | Sb—$AlO_x$—C | Sb—$TiO_x$—C | Sb—$MoO_x$—C |
|---|---|---|---|
| At 25° C. | | | |
| Discharge capacity (mAh/g) | 607 | 724 | 765 |
| Charge capacity (mAh/g) | 463 | 491 | 537 |
| $1^{st}$ cycle efficiency (%) | 76 | 68 | 70 |
| Capacity retention after 100 cycles (%) | 93 | 83 | 70 |
| At 55° C. | | | |
| Discharge capacity (mAh/g) | 815 | 761 | 896 |
| Charge capacity (mAh/g) | 596 | 503 | 635 |
| $1^{st}$ cycle efficiency (%) | 73 | 66 | 71 |
| Capacity retention after 100 cycles (%) | 83 | 78 | 68 |
| At 25° C. with 300 ppm $Mn^{2+}$ | | | |
| Discharge capacity (mAh/g) | 715 | 765 | 820 |
| Charge capacity (mAh/g) | 506 | 503 | 570 |
| $1^{st}$ cycle efficiency (%) | 71 | 66 | 70 |
| Capacity retention after 100 cycles (%) | 90 | 87 | 69 |

One of the difficulties with the $LiMn_2O_4$ spinel cathodes is the poisoning of the carbon anode by the dissolved $Mn^{2+}$ ions from the cathode lattice. Accordingly, the inventors studied the cyclability of all the three Sb-$MO_x$—C nanocomposite anodes at 25 C. in presence of 300 ppm $Mn^{2+}$ in the electrolyte. i.e. the experiments were carried out by intentionally adding required amount of anhydrous manganese perchlorate salt to the electrolyte (to give 300 ppm $Mn^{2+}$) before assembling the cell. As seen, the cyclabilities of the nanocomposite anodes did not differ significantly on adding $Mn^{2+}$, suggesting that these nanocomposite anodes may not be poisoned by $Mn^{2+}$ and they may have potential to be employed with manganese spinel cathodes in lithium ion cells.

Figure 14A:
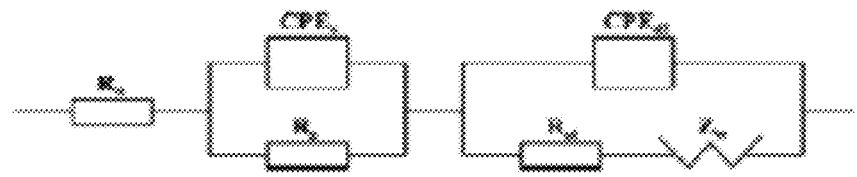
FIG. 14A shows the equivalent circuit for the Sb-MO$_x$—C (M=Al, Ti, and Mo) nanocomposites
Figure 14B:
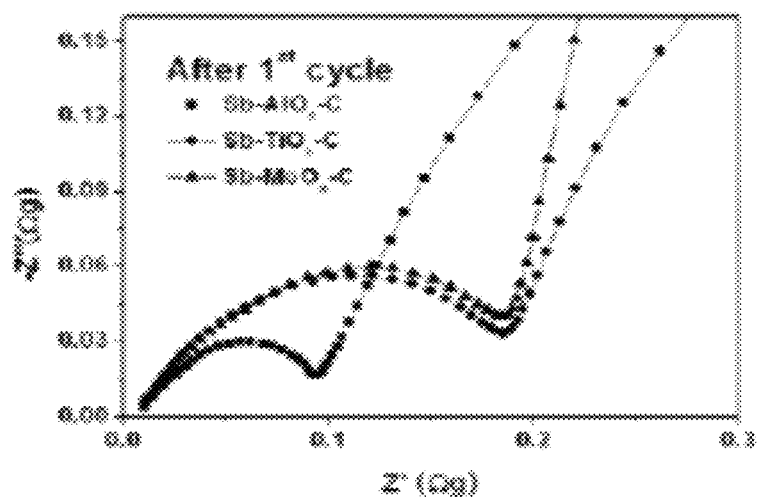
FIG. 14B shows the electrochemical impedance spectra (EIS) of the nanocomposites at 1st and 20th cycles.
Figure 14B:
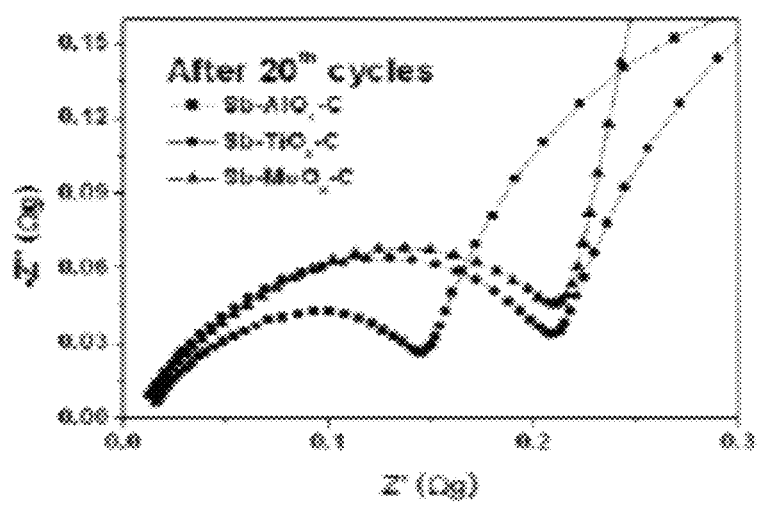

To further study the electrochemical performances, EIS measurements were carried out at 2 V vs. Li/$Li^+$ with all the three nanocomposite samples at different cycles such as after 1st cycle and 20th cycle. The EIS data were analyzed based on an equivalent circuit given in FIG. 14A, where $R_u$ refers to uncompensated resistance between working electrode and lithium reference electrode, $CPE_s$ refers to constant phase element of the surface layer, $R_s$ refers to resistance of the SEI layer, $CPE_{dl}$ refers to CPE of the double layer, $R_{ct}$ refers to charge transfer resistance, and $Z_w$ refers to Warburg impedance. In general, the EIS spectrum can be divided into three frequency regions, i.e, low, medium to low, and high frequency regions, which correspond, respectively, to cell geometric capacitance, charge transfer reaction, and lithium ion diffusion through the surface layer. The EIS spectra recorded after 1st and 20th cycles in FIG. 14B consist of one semicircle and a line. The diameter of the semicircle is a measure of the charge transfer resistance $R_{ct}$, which is related to the electrochemical reaction between the particles or between the electrode and the electrolyte. On the other hand, the sloping line is related to lithium ion diffusion in the bulk of the active material. The diameter of the semicircle increases on going from 1st to 20th cycle, indicating an increase in $R_{ct}$ as the electrode is cycled, possibly due to the breaking of the inter-particle contact caused by the volume expansion. Among the three nanocomposites investigated, the M=Al nanocomposite shows the lowest charge transfer resistance at both the 1st and 20th cycles (0.1 and 0.17ohm. g, respectively, at the 1st and 20th cycles). This implies that $Al_2O_3$ is more effective in accommodating the volume expansion smoothly compared to $TiO_2$ and $MoO_3$, which is consistent with the cyclability data in FIG. 13.

The $Sb-MO_x$—C (M=Al, Ti, and Mo) nanocomposites of the present invention were synthesized by a mechanochemical reduction of $Sb_2O_3$ with Al, Ti, or Mo in the presence of acetylene black carbon and have been studied as an anode material for lithium ion batteries. Characterization data collected with XRD, XPS, TEM, and STEM revealed an uniform dispersion of the Sb nanoparticles within the $MO_x$ and conductive carbon matrix. The $Sb-MO_x$—C nanocomposite exhibited excellent electrochemical performances, with the M=Al nanocomposite offering a capacity of >430 mAh/g after 100 cycles. The buffering effect provided by the amorphous metal oxide and conductive carbon matrix mitigates the problems normally encountered with the volume changes occurring during cycling and leads to good electrochemical performance. The disclosure demonstrates that the problems normally encountered with the huge volume expansion associated with the alloy anodes could be minimized by a rational design of nanocomposite microstructures as described in the present invention.

It is contemplated that any embodiment discussed in this specification can be implemented with respect to any method, kit, reagent, or composition of the invention, and vice versa. Furthermore, compositions of the invention can be used to achieve methods of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine experimentation, numerous equivalents to the specific procedures described herein. Such equivalents are considered to be within the scope of this invention and are covered by the claims.

All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, MB, BBC, AAABCCCC, CBBAAA, CABABB, and so forth. The skilled artisan will understand that typically there is no limit on the number of items or terms in any combination, unless otherwise apparent from the context.

All of the compositions and/or methods disclosed and claimed herein can be made and executed without undue experimentation in light of the present disclosure. While the compositions and methods of this invention have been described in terms of preferred embodiments, it will be apparent to those of skill in the art that variations may be applied to the compositions and/or methods and in the steps or in the sequence of steps of the method described herein without departing from the concept, spirit and scope of the invention. All such similar substitutes and modifications apparent to those skilled in the art are deemed to be within the spirit, scope and concept of the invention as defined by the appended claims.

What is claimed is:

1. A method of making a composition, comprising:
   providing antimony oxide particles;
   providing metal particles;
   providing at least one conductive carbon compound;
   mixing together the antimony oxide particles with the metal particles and at least one conductive carbon compound,
   subjecting the mixture to a mechanical milling process, wherein during the mechanical milling process oxygen from the antimony oxide particles is transferred to the metal to oxidize the metal, which, in combination with at least one conductive carbon compound, forms an Sb-MOx-C nanocomposite, where M is Al, Mg, Ti, V, Cr, Mn, Fe, Co, Ni, Zr, Mo, W, Nb, Ta, or combinations thereof.

2. The method of claim 1, wherein the mechanical milling process is a ball milling process.

3. The method of claim 1, wherein the mechanical milling process is performed for a time sufficient to allow reduction of substantially all of the antimony oxide to antimony metal.

4. The method of claim 1, wherein the metal particles are magnesium particles, vanadium particles, chromium particles, manganese particles, iron particles, cobalt particles, nickel particles, zirconium particles, tungsten particles, niobium particles, tantalum particles, or combinations thereof.

5. The method of claim 1, wherein the metal particles comprise aluminum particles.

6. The method of claim 1, wherein the metal particles comprise titanium particles.

7. The method of claim 1, wherein the metal particles comprise molybdenum particles.

8. The method of claim 1, wherein the conductive carbon particles comprise particles of activated carbon.

9. The method of claim 1, wherein the weight ratio of antimony oxide particles and metal particles to the conductive carbon compound is greater than 1.

10. The method of claim 1, wherein the weight ratio of antimony oxide particles and metal particles to the conductive carbon compound is about 80:20.

11. The method of claim 1, wherein the metal particles comprise aluminum particles, and wherein the molar ratio of antimony oxide particles to aluminum particles is about 1:2.

12. The method of claim 1, wherein the metal particles comprise titanium particles, and wherein the molar ratio of antimony oxide particles to titanium particles is about 2:3.

13. The method of claim 1, wherein the metal particles comprise molybdenum particles, and wherein the molar ratio of antimony oxide particles to molybdenum particles is about 2:3.

* * * * *

UNITED STATES PATENT AND TRADEMARK OFFICE
CERTIFICATE OF CORRECTION

PATENT NO. : 9,882,210 B2
APPLICATION NO. : 13/301447
DATED : January 30, 2018
INVENTOR(S) : Manthiram et al.

Page 1 of 1

It is certified that error appears in the above-identified patent and that said Letters Patent is hereby corrected as shown below:

In the Specification

In Column 1, Line 11, please add "This invention was made with government support under Grant no. W-7405-ENG-48 awarded by the Department of Energy. The government has certain rights in the invention."

Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office*